United States Patent
Rehkemper et al.

(10) Patent No.: US 6,862,973 B2
(45) Date of Patent: Mar. 8, 2005

(54) PNEUMATIC MOTOR

(75) Inventors: Jeffrey Rehkemper, Chicago, IL (US); Charles Hartlaub, Glendale Heights, IL (US)

(73) Assignee: Rehco, LLC, Chicago, IL (US)

( * ) Notice: Subject to any disclaimer, the term of this patent is extended or adjusted under 35 U.S.C. 154(b) by 34 days.

(21) Appl. No.: 10/627,134

(22) Filed: Jul. 25, 2003

(65) Prior Publication Data
US 2004/0060429 A1 Apr. 1, 2004

Related U.S. Application Data

(63) Continuation of application No. 10/112,665, filed on Mar. 28, 2002, now Pat. No. 6,626,079.

(51) Int. Cl.[7] .................................. F01L 21/02
(52) U.S. Cl. .......................... 91/325; 91/343
(58) Field of Search ............... 60/370; 91/303, 91/316, 325, 341 R, 343

(56) References Cited

U.S. PATENT DOCUMENTS

| | | |
|---|---|---|
| 724,262 A | 3/1903 | Cole |
| 819,653 A | 5/1906 | Hawke |
| 1,502,244 A | 7/1924 | Gore |
| 2,115,556 A | 4/1938 | Maniscalco |
| 2,545,586 A | 3/1951 | Pollak |
| 2,596,000 A | 5/1952 | Weiss |
| 2,821,808 A | 2/1958 | Rosato |
| 2,943,417 A | 7/1960 | Greenspan et al. |
| 3,078,033 A | 2/1963 | Ovrutsky |
| 3,310,024 A | 3/1967 | McConnell |
| 3,645,169 A | 2/1972 | Clark |
| 3,703,848 A | * 11/1972 | Brown, 4th .................. 91/325 |
| 3,716,310 A | 2/1973 | Guenther |
| 3,789,540 A | 2/1974 | Convertine et al. |
| 3,799,034 A | 3/1974 | Haglund et al. |
| 3,910,160 A | 10/1975 | Divine |
| 3,925,984 A | 12/1975 | Holleyman |
| 3,950,889 A | 4/1976 | Dabney |
| 4,024,840 A | 5/1977 | Christy |
| 4,104,955 A | 8/1978 | Murphy |
| 4,159,705 A | 7/1979 | Jacoby |
| 4,224,798 A | 9/1980 | Brinkerhoff |

(List continued on next page.)

*Primary Examiner*—Thomas E. Lazo

(57) ABSTRACT

In one embodiment a pneumatic motor is provided that includes an intake chamber in fluid communication with at least one intake channel. Each intake channel is further in fluid communication with a corresponding cylinder, which receives a piston that cycles upwardly and downwardly to rotate a motor axle. A member is placed in each intake channel to seal the corresponding cylinder from each intake channel when compressed fluid in the intake channel has a higher pressure then pressure in the corresponding cylinder. Each piston includes an actuator extending downwardly from the piston and having a profile that, during a portion of the upward cycle of the piston, causes the actuator to push the member back into each intake channel to allow compressed fluid into each of the corresponding cylinders. Each piston includes an intermediate section that has an annular groove, a seal positioned in the groove that creates a fluid tight seal against the corresponding cylinder during the upward cycle of the piston. Compressed fluid that enters the corresponding cylinder during the upward cycle will push the piston upwardly. Each section further includes exhaust grooves defined thereon such during the downward cycle of the piston the seal is broken allowing compressed fluid in the cylinder to bypass the piston and escape through a vent above each cylinder. This causes the compressed fluid in the intake channel to push the member to re-seal the cylinder. The upward movement of the piston further generates inertia that moves the piston downward to continue the cycle.

20 Claims, 9 Drawing Sheets

U.S. PATENT DOCUMENTS

| | | | |
|---|---|---|---|
| 4,292,804 A | 10/1981 | Rogers, Sr. | |
| 4,311,084 A | 1/1982 | Pierce | |
| 4,329,806 A | 5/1982 | Akiyama et al. | |
| 4,370,857 A | 2/1983 | Miller | |
| 4,386,890 A | 6/1983 | Berkowitz | |
| 4,403,581 A | 9/1983 | Rogachevsky | |
| 4,487,561 A | 12/1984 | Eiermann | |
| 4,614,085 A | 9/1986 | Neukomm | |
| 4,638,633 A | 1/1987 | Otters | |
| 4,765,292 A | 8/1988 | Morgado | |
| 4,766,802 A | 8/1988 | Caenazzo et al. | |
| 4,829,954 A | 5/1989 | Morgado | |
| 4,885,978 A | 12/1989 | Caenazzo et al. | |
| 4,979,878 A | * 12/1990 | Short et al. | 417/255 |
| 5,011,382 A | 4/1991 | Thompson | |
| 5,261,311 A | 11/1993 | Cloup | |
| 5,375,417 A | 12/1994 | Barth | |
| 5,515,675 A | 5/1996 | Bindschatel | |
| 5,529,527 A | 6/1996 | Watkins | |
| 5,531,627 A | 7/1996 | Deal | |
| 5,634,840 A | 6/1997 | Watkins | |
| 5,680,840 A | 10/1997 | Mandella | |
| 5,732,673 A | 3/1998 | Mandella | |
| 5,772,491 A | 6/1998 | Watkins | |
| 5,819,533 A | 10/1998 | Moonen | |
| 5,839,940 A | 11/1998 | Ensmenger | |
| 6,006,519 A | 12/1999 | Hormell, Jr. | |
| 6,085,631 A | 7/2000 | Kownacki | |
| 6,230,605 B1 | 5/2001 | Kownacki | |
| 6,276,353 B1 | 8/2001 | Briggs et al. | |
| 6,311,486 B1 | 11/2001 | Negre et al. | |

\* cited by examiner

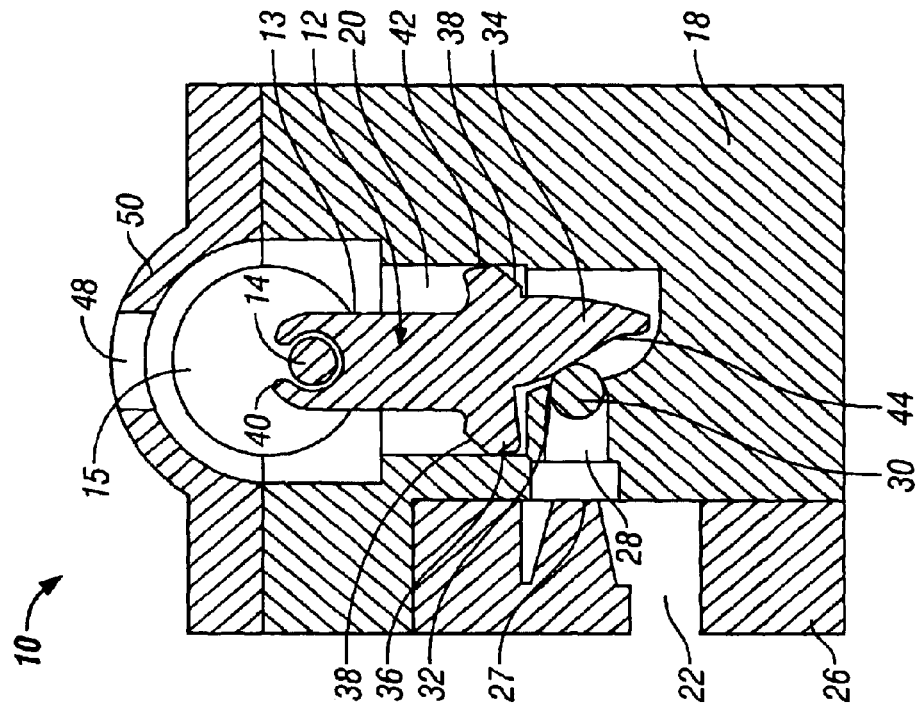
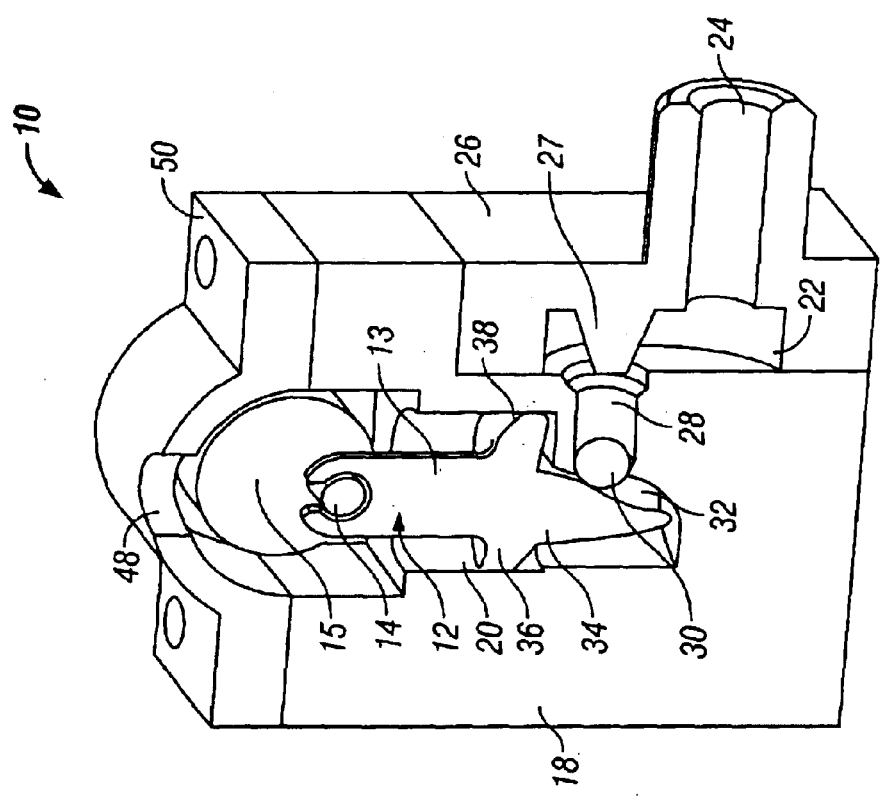
FIG. 2
FIG. 1

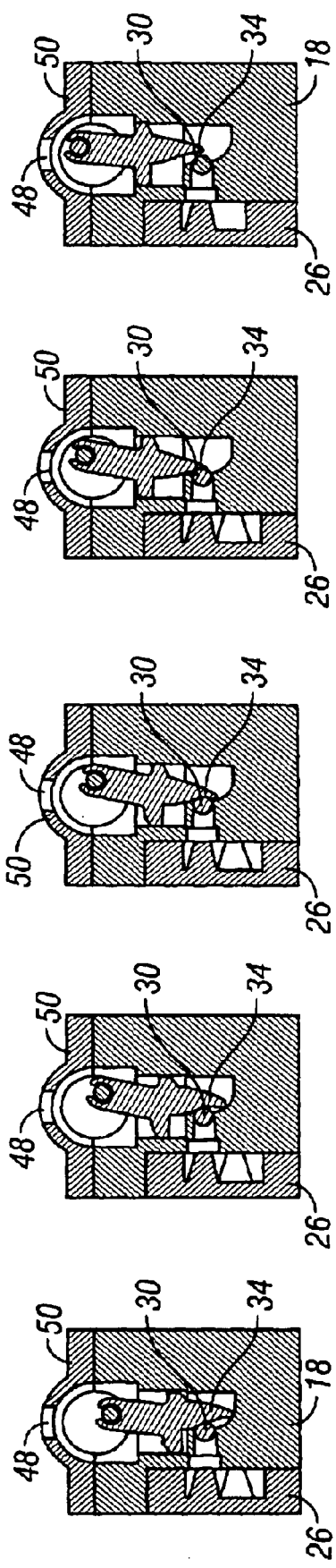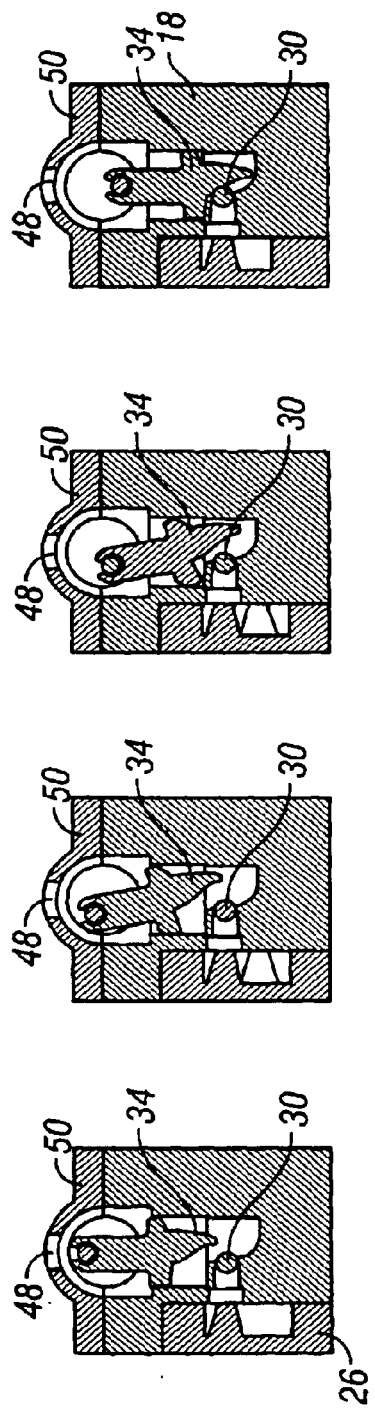

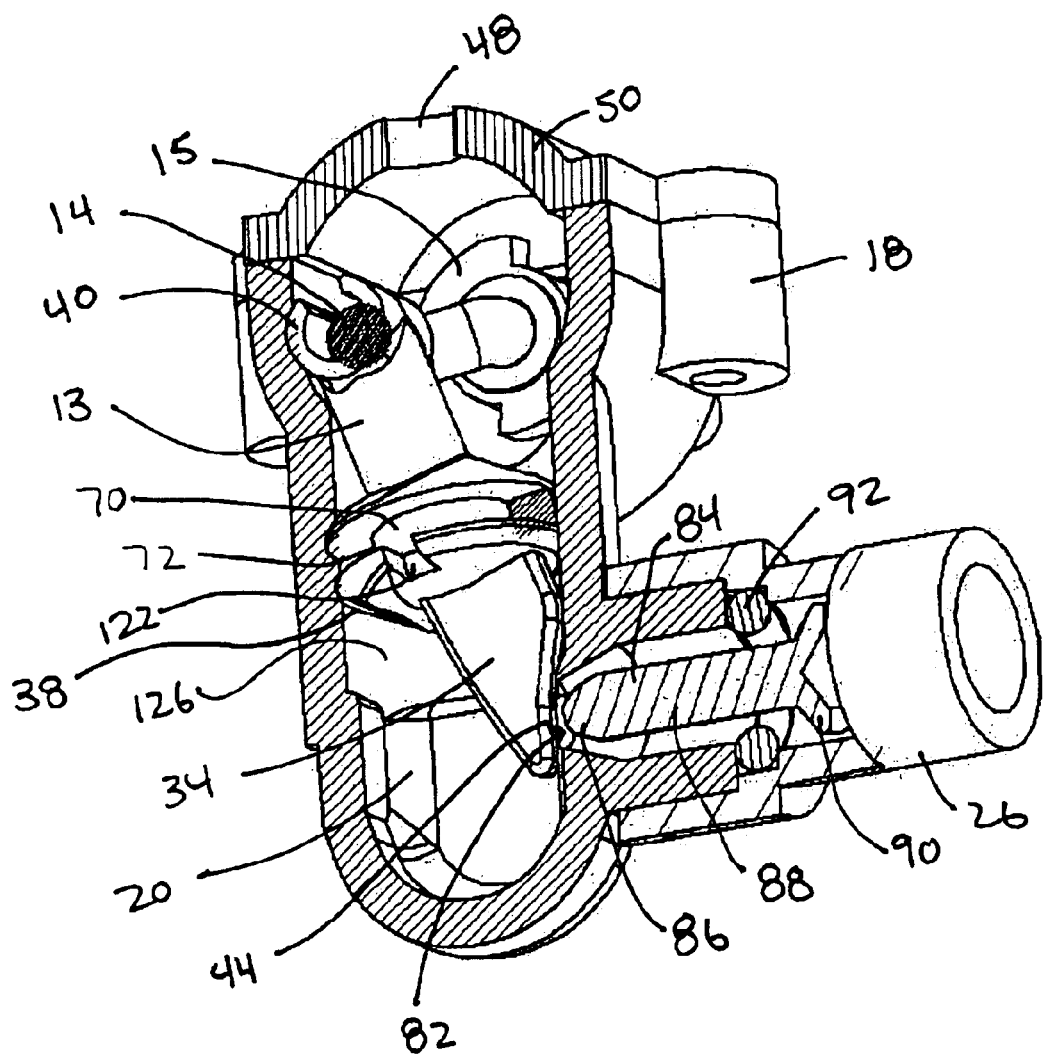

PNEUMATIC MOTOR

CROSS REFERENCE TO RELATED APPLICATIONS

The present application is a continuation in part application of U.S. patent Ser. No. 10/112,665 and filed on Mar. 28, 2002, now U.S. Pat. No. 6,626,079.

BACKGROUND OF THE INVENTION

The present invention relates to pneumatic operated motors, and in particular to a motor that uses compressed fluid or air to power the motor. A pneumatic motor may be used in a wide variety of applications, from wheeled vehicles to propeller operated airplanes and helicopters, as well as air powered boats. In addition, other applications in various other fields of use are just now being realized, such as any air powered or battery powered product.

One problem in the prior art, which is realized and solved by the present invention, is simplicity. The ability to provide an efficient pneumatic motor without the need of complicated intake and exhaust ports, spring operated pistons, valve rods, piston connection rods, specially designed seal skirts, complicated drive axle mountings, etc. All of which complicates the manufacturing of the pneumatic motor and increases the likelihood that an individual part will break making the motor inoperable. As such a need exists to improve upon the prior art pneumatic motors. Such an improvement should simplify the manufacturing by eliminating the need for complicated mechanisms, additional rods, seals, springs and etc. Such an improvement will further provide for pneumatic motors that may be made smaller, lighter and less expensive than other prior art motors.

For example, U.S. Pat. No. 4,329,806 to Akiyama discloses a fluid engine for use in pneumatic operated toys. The '806 patent uses a complicated structure that includes a intake valve rod that is connected to a disc element that is also connected to a parallel drive axle. A piston, perpendicular to the drive axle and the valve rod, is in communication with the disc element that is rotated by the upward and downward movement of the piston. The disc element also includes a profile surface in contact with the valve rod. When the disc element rotates, the profile surface causes the valve rod to move inwardly, when the piston is moving upwardly, and to move outward, when the piston is moving downwardly. In addition, when the valve rod moves inwardly, fluid or compressed air enters the chamber. The air pushes the piston upwards and eventually expels out of a side exhaust. The inertia in the drive axle caused of the upward movement of the piston will continue to move the piston downwards such that the process will continue, until the air runs out.

U.S. Pat. No. 6,006,517 to Kowanacki utilizes a compressed spring to close an intake valve, where air enters into the cylinder or chamber. A valve member is pushed upwardly by the compressed spring against an aperture creating a air tight seal. A piston moving downwards pushes the member down passed an intake valve, allowing compressed air to flow over the member through the aperture into a chamber. The air pushes the piston up causing a drive axle attached thereto to rotate. Once the piston is moved up the compressed spring pushes the member back up closing the intake valve. Moreover, the air entering the chamber with the piston escapes out of side exhaust ports (cut into the chamber) when the piston reaches the top position. U.S. Pat. No. 6,085,631 utilizes the same principles in the '517 patent except it introduces a low/high pressure seal that expands when air is pressed up against it.

In addition it is well known that when manufacturing, the size of the product will be dependent upon all of the parts. If a pneumatic motor is desired to be extremely small, say the size of about an inch in length or less, it would be virtually and/or practically impossible using the pneumatic motors of the prior art to manufacture all of the parts small enough and assembly the same to fit this size. A benefit realized by the pneumatic motor of the present invention was found that the size could be made extremely small because of the simplicity of the present invention.

However on the other extreme, because of the simplicity it is also extremely easy to make the pneumatic motor larger. As such, the present invention finds applicability in compressed fluid-powered engines used for operating automobiles, such as described by U.S. Pat. No. 6,006,519. The '519 patent discloses a compressed air-powered engine designed for use in an internal combustion engine, using a "Wankel-type rotary engine."

SUMMARY OF THE INVENTION

In accordance with the present invention a pneumatic motor is provided. The pneumatic motor includes at least one piston, each of which is attached to a crank shaft such that when the piston cycles through an power and exhaust stroke an axle attached to the crank shaft rotates therewith. The pneumatic motor includes a housing having a cylinder for each piston. Each cylinder is in fluid communication with a corresponding intake channel in the housing that is also in fluid communication with an intake chamber. Each cylinder further has a corresponding exhaust through the top portion of the housing. Each intake channel houses a intake valve stem that seals the corresponding cylinder from the intake channel when compressed fluid initially enters the intake channel or when the pressure in the intake channel is greater then the pressure in the cylinder.

Each piston is preferably defined by a single rigid piece that has a connecting rod extending upwardly to attach to the crank shaft, an actuator that extends downwardly to contact and push the member, and has a seal about a intermediate section that is defined to create a temporary fluid seal against the corresponding cylinder wall. As mentioned above, extending downwardly from each piston is an actuator that has a profile or camber defined such that the actuator may exert a force against the member sufficient to push the member into the intake channel allowing compressed fluid in the intake channel to enter the corresponding cylinder. The actuator as provided by various embodiments includes a living spring that interacts with the intake valve stem. The actuator or living spring may either be flexible near the intermediate section or flexible near the tip of the actuator, for which the effectiveness of the motor changes according to specific desired results, explained in greater detail below.

The piston as mentioned above includes an intermediate section that has a seal to create a temporary or artificial fluid seal against the corresponding cylinder wall, such that compressed fluid entering the corresponding cylinder via the intake channel cannot initially escape. As such, the compressed fluid exerts a force against the seal and intermediate section pushing the cylinder upwardly. The section further includes exhaust grooves formed therein and positioned such that the fluid seal is created only during upward movement of the piston and the fluid seal is broken during downward movement of the piston. This is caused because during the upward and downward movement of the piston, the connecting rod is a rigid extension of the piston that connects to a rotating crank shaft, such that the piston also pivots within the cylinder. When the fluid seal is temporarily broken, compressed fluid in the cylinder below the intermediate section escapes upwardly past the intermediate section and out through the exhaust. This also causes the compressed fluid in the intake channel to push the member back against the cylinder ensuring that the member re-seals the cylinder from the intake channel.

Inertia from the crank shaft, caused by the upward stroke of the piston, continues to move the piston through the downward stroke into a position in the upward stroke that causes the actuator to contact and push the member inwardly allowing the compressed fluid to reenter the cylinder. Thereby creating a cycle that will continue as long as the supply of compressed fluid to the intake channel(s) is maintained.

The present invention may be designed as small as manufacturing allows as well as large as desired. The present invention may therefore find applicability in full-scale air compressed engines that may be used in vehicles, planes, boats, helicopters, as well as miniature-scaled engines used to operate toys and/or other consumer or industrial air powered or battery powered products.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 1 is a perspective cross-sectional view of a single piston pneumatic motor in accordance with one embodiment of the present invention;

FIG. 2 is a cross-sectional view of the pneumatic motor from FIG. 1;

FIGS. 3a–3i are cross-sectional views of the pneumatic motor from FIG. 1, illustrating the piston through various stages of a single cycle;

FIG. 13 is a partial cross sectional view of the piston illustrated in FIG. 12 as incorporated into a pneumatic motor.

DETAILED DESCRIPTION OF THE EMBODIMENTS

Figure 4:
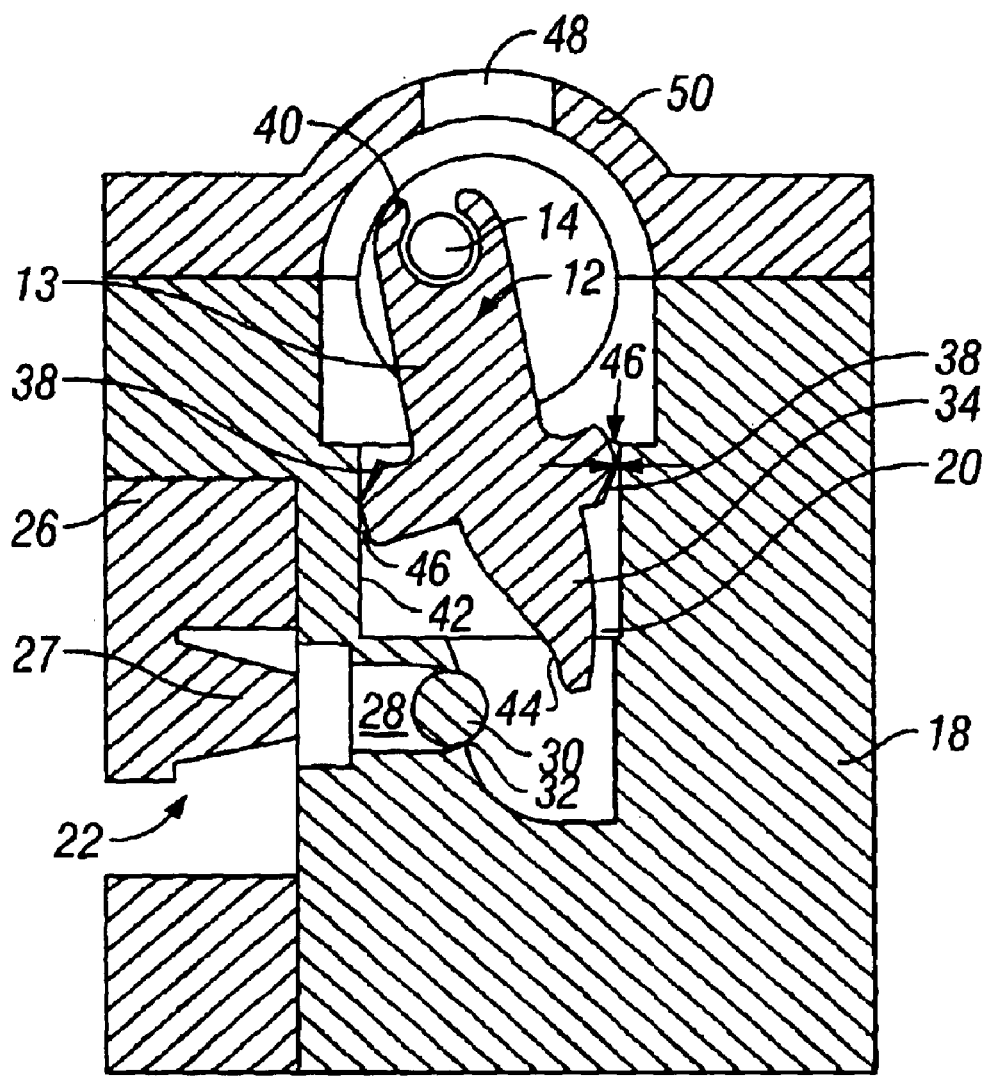
FIG. 4 is a cross-sectional view of the pneumatic motor from FIG. 1, illustrating the piston during the down stroke with the seal between the section and the cylinder walls open allowing compressed fluid to vent.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 5:
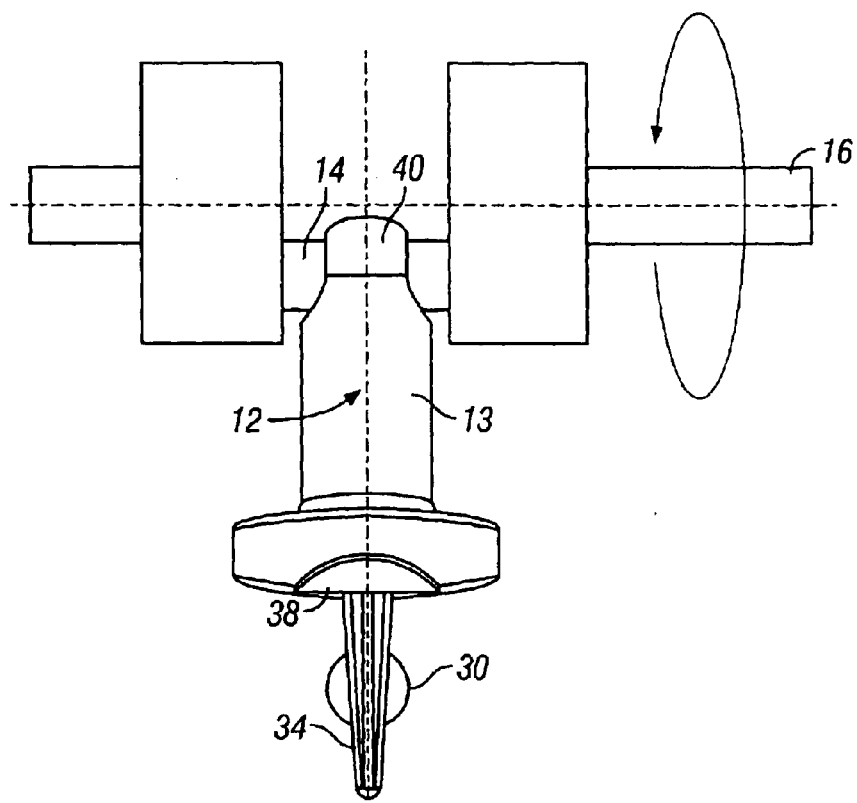
FIG. 5 is a rear view of the piston and crank from FIG. 1.

Referring now to FIGS. 1 and 2, a pneumatic motor 10 in accordance with one embodiment of the present invention includes a piston 12 attached to a crank shaft 14. The crank shaft 14 when rotating drives a main axle 16 (shown in FIG. 5). The main axle 16 may then be attached, by various known means in the art, to any means operable from a motor. Such motor operable means may include wheels and propellers; however, the specific invention is not necessarily limited to such commonly known motor operable means and may also include the ability to produce electrical power from the rotation of the main axle 16, or may be attached to any compressed fluid or compressed air powered product.

Continuing to refer to FIGS. 1 and 2, the motor 10 is defined by a main housing 18, an intake housing 26 and a top motor housing 50. The main housing 18 includes a cylinder 20 integrally molded or bored therethrough. The pneumatic motor 10 is powered by compressed fluid, preferably air, that enters into an intake chamber 22 from an external line 24. The intake chamber 22 is formed inside of the intake housing 26, which is secured to the main housing 18.

From the intake chamber 22, the compressed fluid enters into an intake channel 28 that is grooved into the main housing 18. A member 30, having a diameter less than the diameter of the intake channel 28 is contained therein. The intake channel 28 also includes an intake aperture 32 leading into the cylinder 20 permitting the intake channel 28 to be in fluid communication with the cylinder 20. To keep the member 30 in the intake channel 28, a portion of the entrance of the intake chamber 22 is covered by a protrusion 27 formed out of the intake housing 26. The diameter of the intake aperture 32 is also smaller then the diameter of the member 30, such that the member 30 may extend partly into the cylinder 20 but will not entirely enter into the cylinder 20.

When the cylinder 20 is empty or when it contains fluid that has a pressure less then the pressure of compressed fluid in the intake channel 28, the compressed fluid will act on the member 30 pushing it against the intake aperture 32 creating a fluid tight seal. As such the compressed fluid is prevented from entering the cylinder 20. As discussed in greater detail below, to allow compressed fluid to enter into the cylinder 20, the member 30 is forced or pushed back into the intake channel 28 toward the protrusion 27 by an actuator 34 integrally formed into the lower portion of the piston 12. Once the member 30 is pushed into the intake channel 28, compressed fluid will flow around the member 30 and enter the cylinder 20 through the intake aperture 32.

Continuing to Refer to FIG. 2, the piston 12 and the movement of the piston will now be described in detail. As opposed to other prior art pneumatic motors, the present invention preferably includes a piston 12 that incorporates therein a connecting rod 13, a section 36, an actuator 34 (or a means to allow compressed fluid into the cylinder 20) and exhaust grooves 38 as a single integrally molded piece. However, the present invention may also include a rigid piston that includes as separate parts the connecting rod, the section and the actuator attached thereto.

In other prior art piston motors, the piston and connecting rod are separate. Attached to each other by various gears allowing the piston to move vertically and the connecting rod to transfer the rotation motion of the crank shaft to the piston. However, the present invention incorporates the connecting rod 13 into the piston 12, this causes the piston to move vertically as well as pivotally. As thus permits the piston 12, of the present invention, to perform like a rocker arm or cam utilized in most prior art patents. In addition, the other functions and characteristics in this invention, defined by the movement of the piston 12, are also possible.

Referring still to FIG. 2, the connection rod 13 includes a top portion 40 that clips onto the crank shaft 14. Other attachment means may also be used; for example, the top portion 40 could simply include an aperture that permits the crank shaft 14 to slide therethrough. The crank shaft 14 is further attached to a crank 15, which is attached to the main axle (not shown).

From the position shown in FIG. 2, as soon as the piston 12 moves upward, illustrated in FIG. 3a, the actuator 34 begins to push against the member 30, forcing the member 30 into the intake channel 28. At this point compressed fluid enters the cylinder 20 and pushes against the section 36 forcing the piston upwards, FIGS. 3a–3d. It is important to note, that the section 36 has a diameter that creates a temporary fluid seal against the cylinder walls 42, during the upward stroke of the piston 12. At some point prior to top dead center, shown in FIG. 3e, the actuator 34 on the piston 12 disengages the member 30, but the compressed fluid will continue to push against the section 36, because of the fluid seal.

Another important aspect to note is that the profile 44 of the actuator 34 is defined such that the actuator 34 is in continual engagement with the member 30 during a predetermined part of the cycle. As illustrated in FIGS. 3a–3i, when the piston 12 is moving through a single rotation, the piston 12 also pivots. The profile 44 of the actuator 34 is therefore a function of the pivoting of the piston 12 and the profile of the member 30, such that the actuator 34 exerts a sufficient and continued amount of pressure on the member 30 to force or push the member 30 into the intake channel 28. In addition the profile 44 of the actuator 34 is also a function on the amount of compressed fluid needed to enter the cylinder 20 and force the piston 12 upwards. If the cylinder 20 is larger, more compressed fluid may be needed in the cylinder 20 to properly force the piston 12 through the upward stroke, as such the profile 44 may need to be extended to keep pressure on the member 30 longer.

As mentioned above, throughout this upward movement of the piston 12, a fluid seal is created between the section 36 and the cylinder wall 42 and maintained preventing the compressed fluid from exiting the cylinder 20. The inertia of crank shaft 14 will continue to move the piston 12 past the top dead center position, illustrated in FIG. 3f. Once it is through top-dead center, illustrated in FIGS. 3g–3h, the piston 12 begins to pivot in the opposite direction as shown in FIGS. 3a–3d. The pivot during the downward stroke breaks the fluid seal between the section 36 and the cylinder wall 42, because exhaust grooves 38 (one of which is better illustrated in FIG. 5) formed into the section 36 create temporary passages 46 between the section 36 and the cylinder wall 42, also shown in FIG. 4. The compressed fluid is now able to escape and will continue to escape out of the cylinder 20 until the pneumatic seal between the section 36 and the cylinder wall 42 is re-created. Preferably the fluid seal is broken at a position before top-dead center, FIG. 3f, and created at a position after bottom-dead center, FIG. 3i. However, altering the depth of the exhaust groove 38 may change these positions.

As opposed to other prior art piston motors, the present invention's temporary fluid seal between the piston 12 and the cylinder wall 42 is unique in that the seals utilized in other prior art motors are engaged during the upward and downward stroke of the piston. Typically, the prior art motors never break the seal. The compressed fluid is allowed to exhaust usually through a side exhaust channel that is open when the piston reaches top dead center. As soon as the prior art pistons begin the downward stroke, the seal is re-created. This causes a loss in performance, because the piston will utilize inertia re-compressing any fluid trapped under the seal during the downward stroke and fighting the re-compressed fluid, in order to return to a position that allows more compressed fluid into the cylinder. However, since the present invention maintains the open passages 46 during the downward stroke, there will be virtually no loss or recompression of any fluid during the downward stroke.

When the fluid seal is broken, the compressed fluid escapes the motor 10 through an exhaust 48 in a top motor housing 50. In addition, once the fluid seal is broken there is a pressure difference between the compressed fluid entering the cylinder 20 and the compressed fluid exiting the cylinder 20, ensuring the member 30 seals against the intake aperture 32. As mentioned above the inertia of the crank is sufficient enough to move the piston 12 downwardly to a point in which the actuator 34 begins to push the member 30 inwardly, causing the cycle explained above to repeat.

Once this cycle is started, the pneumatic motor 10 will continue to run until the supply of compressed fluid is expended. To begin the cycle, the main axle 16 may be initially moved, causing the crank 15 to move the piston 12 downwardly to a point past bottom dead center in which the actuator 34 moves the member 30 inwardly. Alternatively, other mechanical or electrical means may be employed to initiate the cycle.

Figure 6:
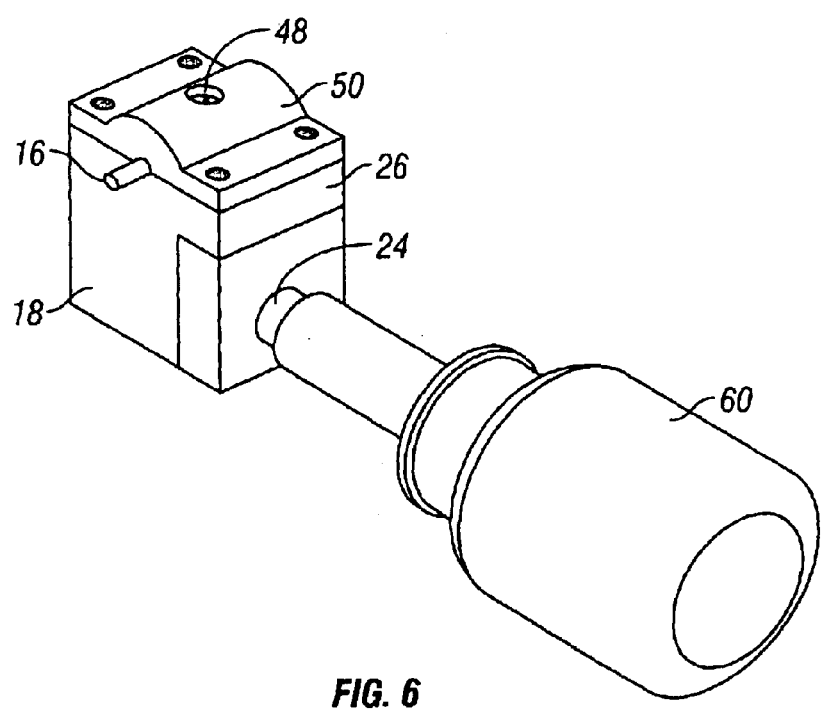
FIG. 6 is a pneumatic motor with an external tank of compressed fluid.
Figure 7:
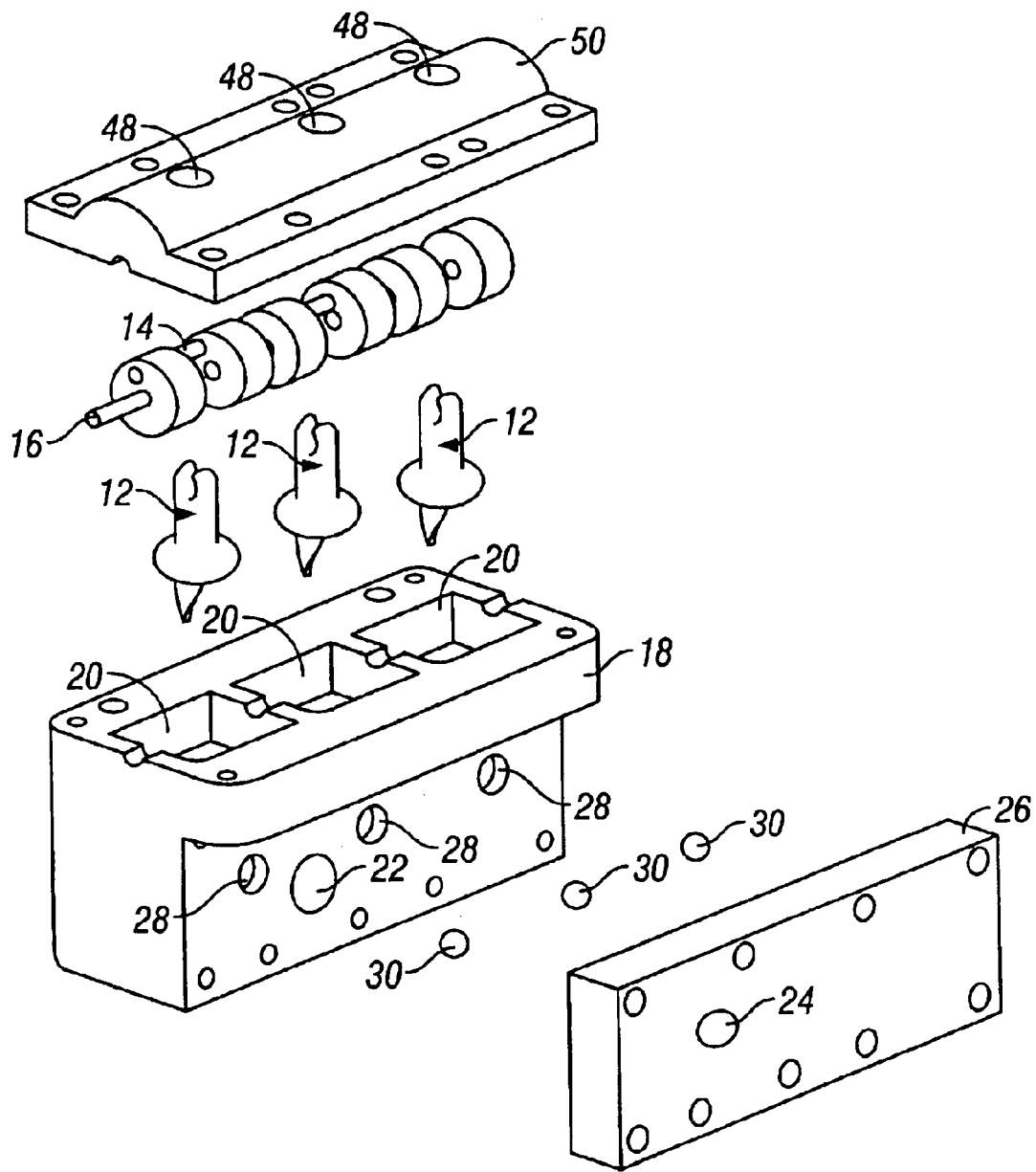
FIG. 7 is an exploded view of a three piston pneumatic motor in accordance with another embodiment of the present invention.

The compressed fluid, in one embodiment, is provided from an external tank 60 that is attached to the external line 24, shown in FIG. 6. The external tank 60 may be a closed system, which would be replaced after exhausted, or refillable. Both types of tank systems are well known in the art. Alternatively the external line 24 may feed directly into a pump system that continuously supplies compressed fluid, also well known in the art.

in addition to the single piston pneumatic motor illustrated herein, multiple piston motors are provided for in additional embodiments. As illustrated in FIG. 7 a three piston 12 pneumatic motor 10 is shown; however two piston pneumatic motors are also embodied herein. The principles discussed herein above for the single piston 12 motor are applicable with a multiple piston motor. In addition, while the pistons are illustrated in series, the pistons could further be provided for in an offset motor, such as found in typically V-8 engines.

Figure 8:
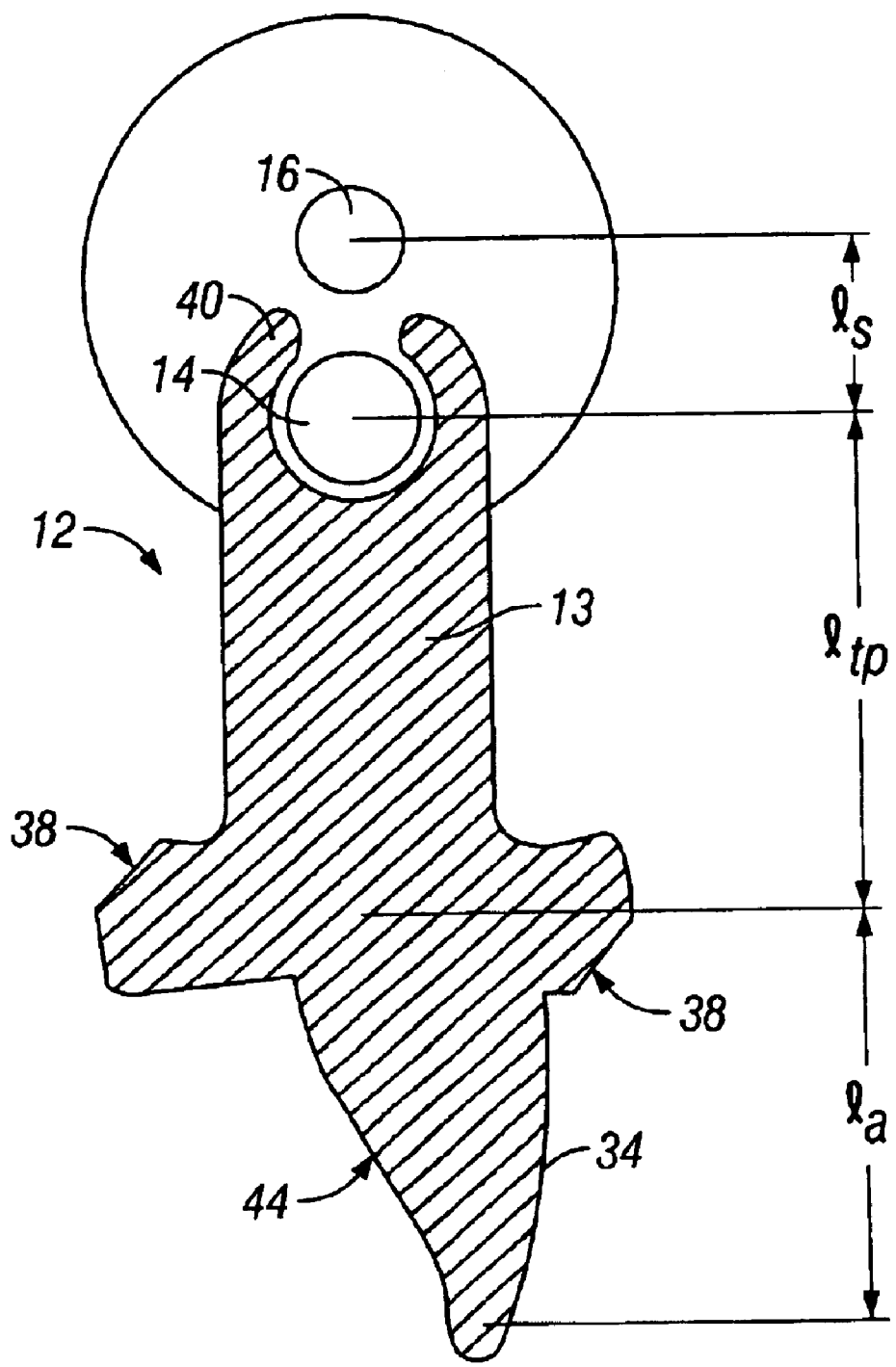
FIG. 8 is a cross-sectional view of a piston in accordance with the present invention.

Referring now to FIG. 8, it should be further understood that changing various dimensions of the piston 12 could alter the performance of the pneumatic motor 10. For instance increasing the exhaust grooves 38 would permit the compressed fluid to exhaust longer. This may be required where the outside fluid is different then the compressed fluid, or where the outside pressure warrants a longer exhaust. The profile 44 may also be changed to control the amount of compressed fluid that enters into the cylinder 20. The length $l_\alpha$ of the actuator 34 may be changed to alter the time the cylinder is under pressure. The length $l_p$ defined by the distance between axis of the crank shaft 14 to the section 34 (length of the connecting rod 13) may be changed to change the stroke length. This could be decreased to further compact the motor. In addition the stroke length $l_s$ defined by the distance from the drive axle 16 to the axis of the crank shaft 14 may be changed to affect the speed of the motor.

Figure 9:
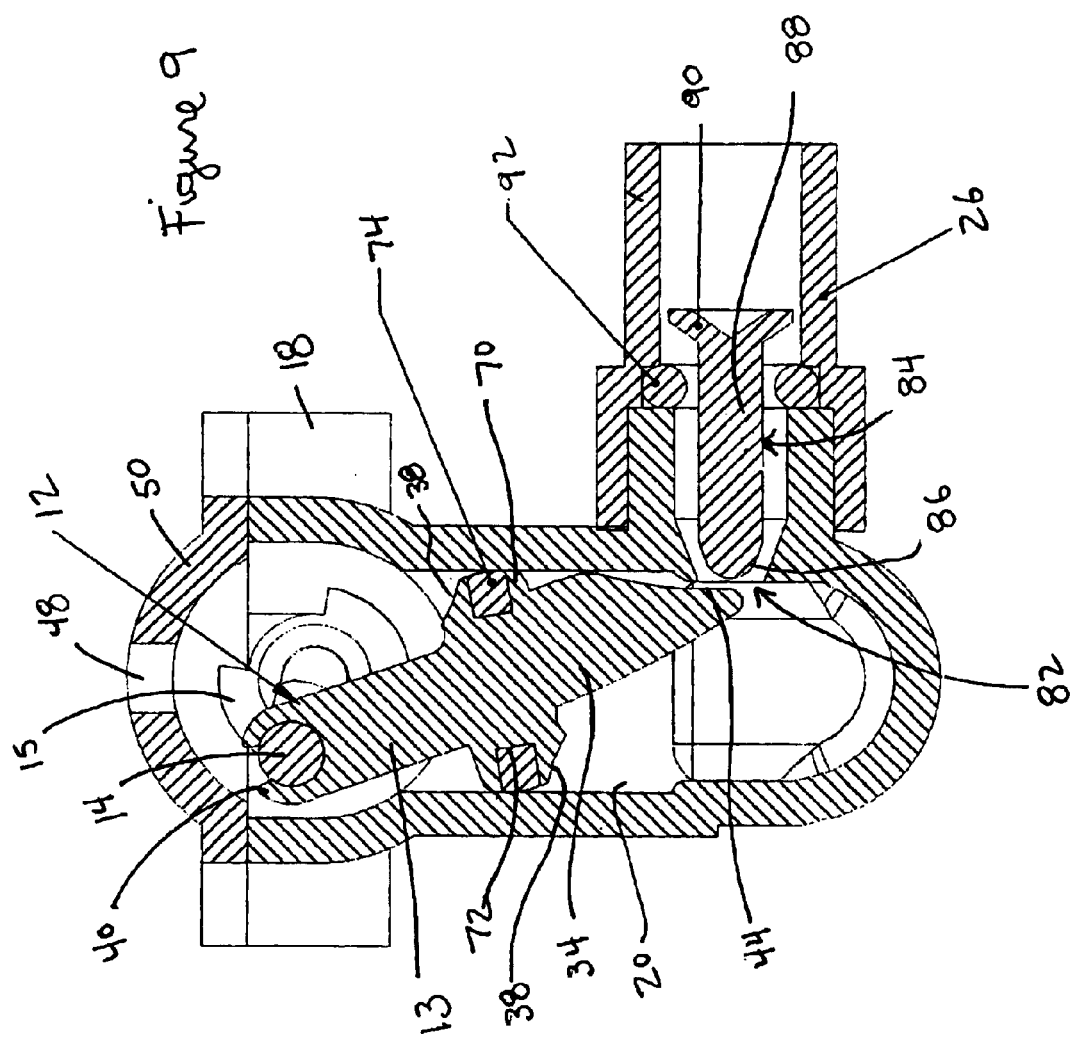
FIG. 9 is a cross-sectional view of a pneumatic motor in accordance with another embodiment of the present invention.

Referring now to FIG. 9, in another embodiment of the present invention, the piston 12 has been modified in order to increase specific efficiencies of the pneumatic motor 10. First, an intermediate section 70 positioned between the connecting rod 13 and the actuator 34 includes an annular groove 72 to accommodate a seal 74. The seal 74 is sized to compress against the cylinder wall creating a more air tight seal and reducing compressed air usage to produce more longer lasting torque. The operation of the piston 12 is however the same as mentioned above and includes similarly referenced components.

Second, the intake chamber 80 has also been modified. The intake chamber 80 includes a valve 82 which is defined as including a valve stem 84 that includes a head portion 86, a body 88 and a tail section 90. The head portion 86 extends into the cylinder 20 and the tail section 90 flanges outwardly from its body 86 to seal against an o-ring 92 positioned between the intake chamber 80 and the intake housing 26. When the pressure in the cylinder 20 is less than the pressure behind the tail section 90, the pressure of the compressed air pushes the valve stem 84 into the cylinder 20 creating an air tight seal between the tail section 90 and the o-ring 92, closing the valve 82. The profile 44 of the actuator 34 will contact the head portion 86 of the valve stem 84 similarly to the profile 44 contacting the member 30 in the previous embodiments, such that the valve stem 84 will be forced away from the cylinder 20 breaking the air tight seal between the tail section 90 and the o-ring 92 to allow compressed air into the cylinder 20. Thus opening the valve 82. This configuration helps eliminate leaking around the member 30 while positioned against the intake aperture 32 as well as eliminate wear and failure between the same. This configuration also reduces the high tolerance required to produce the correct intake aperture 32 needed for a specific member 30. As a single intake aperture 32 can be designed with various sized valve stems 84 such that amount of the valve stem 84 extended into the cylinder 20 can be controlled, thereby, controlling the amount of compressed air permitted into the cylinder 20 which permits a more flexible intake and actuator design.

Figure 10:
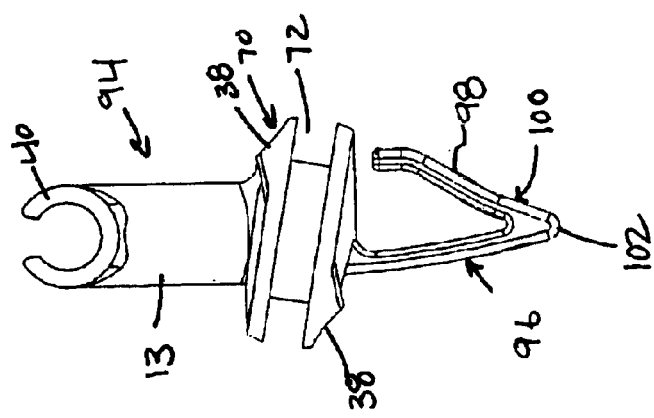
FIG. 10 is a side view of another type of piston having a seal positioned in an intermediate section of the piston and having a actuator that has a flexible section near the intermediate section.

FIG. 10 illustrates a side view of another type of piston 94. The piston includes an annular groove 72 that is defined on the intermediate section 70 of the piston 94 between the connecting rod 13 and an actuator 96. The annular groove 72 is sized to accommodate a seal (not shown). The actuator 96 includes a rigid section 97 extending away from the intermediate section 70 to a tip 102, from the tip 102 the actuator 96 includes a flexible section 98 that extends towards the intermediate section 70. The flexible section 98 is molded and shaped to have a profile 100 that acts against the head section 86 of the valve stem in order to permit compressed air into the cylinder 20. The flexible section 98 has an increasing flexibility traveling from the tip 102 towards the intermediate section 70. As the air pressure decreases, the actuator 94 is capable of opening the valve 82 sooner, increasing the time the valve 82 is opened towards the initial engagement with the valve stem 86.

Figure 11:
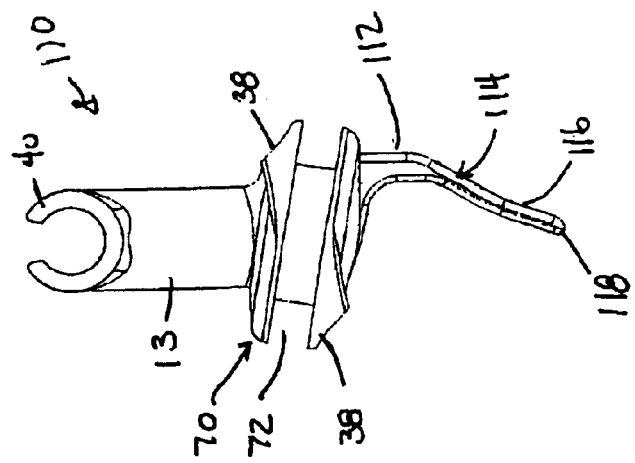
FIG. 11 is a side view of another type of piston having a seal positioned in an intermediate section of the piston and having a actuator that has a flexible section that is distal to the intermediate section.

FIG. 11 illustrates a side view of another type of piston 110. The actuator 112 includes a flexible section 114 that comes into contact with the valve stem 86. The flexible section 114 is molded and shaped to have a profile 116 that acts against the head section 86 of the valve stem in order to permit compressed air into the cylinder 20. The flexible section 114 has a decreasing flexibility traveling from the tip 118 towards the intermediate section 70 having the greatest flexibility at the tip 118 of the actuator 112. As the air pressure decreases, the actuator 94 is capable of keeping the valve 82 open longer, increasing the time the valve 82 is opened towards the end of the actuator engagement with the valve stem 86.

Figure 12:
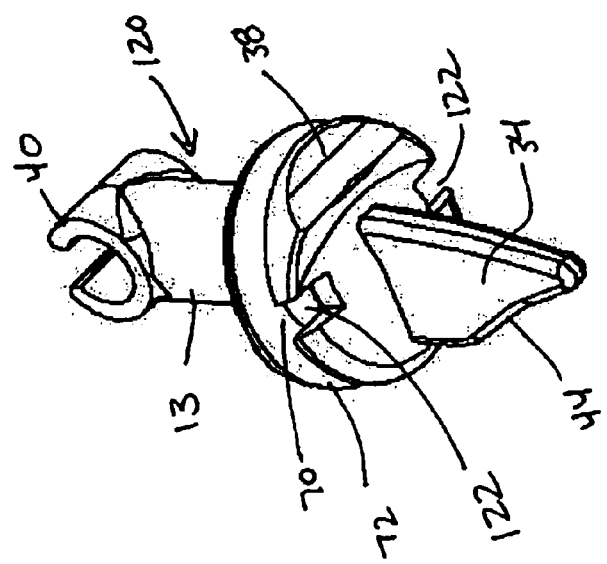
FIG. 12 is a perspective bottom elevational view of a piston in accordance with another embodiment that incorporates grooves in an intermediate section of the piston.

FIGS. 12 and 13 illustrate yet another embodiment of a piston 120 that includes similar components to the piston illustrated in FIG. 9, except that the intermediate section 70 positioned between the connecting rod 13 and the actuator 34 includes notches 122 such that the annular groove 72 is opened to a region 126 (of the cylinder 20) below the intermediate section 70. While not illustrated, the annular groove 72 includes a seal (similar to the seal 74 shown and described in reference to FIG. 9). During operation, the profile 44 of the actuator 34 will act against the valve 82 to permit compressed air to enter the region 126 of the cylinder 20 below the intermediate section 70. The compressed air will then travel through the notches 122 into the annular groove 70 pressing the seal (not shown) outwardly (as the compressed air tries to escape or vent out of the cylinder 20). As the seal presses outwardly, the seal forms a tighter seal against the cylinder wall. Requiring a stronger force to move the piston through the power stroke until the piston rocks/tilts and enters the exhaust stroke at which point the seal is broken and the compressed air in the region 126 is able to vent past the exhaust grooves 38. During the exhaust stroke, the compressed air that entered the annular groove 70 will also vent via the exhaust grooves 38. The stronger force required to move the piston will transfer into inertia and allowing the piston to move quicker through the exhaust stroke and in all likelihood increase the power of the piston.

In the flexible actuator arrangements the actuator reduces power and air consumption during high pressure and increases power and air consumption during low pressure. This helps regulate the power produced when the motor is attached to a finite container or reservoir of compressed air. While the two arrangements achieve the same results, the methods are opposite, the first spring actuator 94 opens the valve earlier as the pressure drops and the second spring actuator 110 keeps the valve opened longer as the pressure drops.

In accordance with the present invention, the pneumatic motor disclosed herein may be designed as small as manufacturing allows as well as large as desired. The present invention may therefore find applicability in full-scale air compressed engines that may be used in vehicles, planes, boats, helicopters, as well as miniature-scaled engines used to operate toys or other small motor operated devices without the need for batteries.

From the foregoing and as mentioned above, it will be observed that numerous variations and modifications may be effected without departing from the spirit and scope of the novel concept of the invention. Including combining various disclosed features together in ways not specifically mentioned, for example, the notches in the intermediate section can be used with any of the pistons mentioned throughout that include seals. It is to be understood that no limitation with respect to the specific methods and apparatus illustrated herein is intended or should be inferred. It is, of course, intended to cover by the appended claims all such modifications as fall within the scope of the claims.

What is claimed is:

1. A pneumatic motor comprising a piston sized to be received in a cylinder, the piston includes an intermediate section, a connecting rod extending away from the intermediate section to engage a crank shaft, and an actuator extending away from the intermediate section to cyclically engage a valve to allow compressed fluid into the cylinder during a power stroke of the piston, the intermediate section having an annular groove and a seal positioned in the groove to creates a fluid tight seal with the cylinder during the power stroke, and the intermediate section further including notched exhaust vents positioned to temporarily break the fluid tight seal during an exhaust stroke of the piston.

2. The pneumatic motor of claim 1, wherein:
the valve includes a valve stem positioned in an intake chamber in communication with the cylinder, the valve stem having a head protruding into the cylinder and outwardly flanged tail that engages an o-ring to create a fluid tight seal; and
the actuator includes a profile defined to push the head of the valve stem into the intake chamber to brake the fluid tight seal of the flanged tail and o-ring and allow compressed fluid contained in the intake chamber to enter the cylinder.

3. The motor of claim 2, wherein the exhaust vents are defined such that the fluid tight seal between the piston and the cylinder is broken during the exhaust stroke of the piston such that compressed fluid in the cylinder is permitted to vent during the exhaust stroke of the piston.

4. The motor of claim 1, wherein the actuator includes a rigid section extending away from the intermediate section to a tip and includes a flexible section that extends towards the intermediate section, the flexible section has a profile that engages the valve.

5. The motor of claim 4, wherein the flexible section has an increasing flexibility traveling from the tip towards the intermediate section such that as a pressure of the compressed fluid decreases, the actuator opens the valve towards the initial engagement with the valve.

6. The motor of claim 1, wherein the actuator includes a flexible section that extends away from the intermediate section to a tip, the flexible section has a profile that engages the valve.

7. The motor of claim 6, wherein the flexible section has a decreasing flexibility traveling from the tip towards the intermediate section having such that as a pressure of the compressed fluid decreases, the actuator opens the valve towards the end of the actuator engagement with the valve.

8. The motor of claim 1, wherein the intermediate section includes a notch such that the annular groove is opened to a region defined by the cylinder which is below the intermediate section.

9. A piston for use in a pneumatic motor, the piston comprising:
a intermediate section that has an annular groove, a seal positioned in said annular groove that creates a fluid seal against a cylinder defined by the pneumatic motor when the piston is moving in a power stroke, and the intermediate section further includes exhaust vents positioned to temporarily open the fluid seal when the piston is moving in a exhaust stroke,
a rigid connecting rod extending away from the intermediate section to engage a crank shaft defined by the pneumatic motor; and
an actuator extending away from the intermediate section and having a means to engage and temporarily open a valve for a predetermined period of time, the valve being defined by the pneumatic motor as a means to prevent compressed fluid into the cylinder.

10. The piston of claim 9, wherein the actuator includes a flexible portion having a profile defined to engage and temporarily open said valve for a predetermined portion of the power stroke.

11. The piston of claim 10, wherein the actuator is defined as having a rigid portion extending away from the intermediate section to a tip and a flexible section extending away from the tip towards the intermediate section, the flexible section having an increasing flexibility traveling from the tip towards the intermediate section such that the flexible section opens the valve more towards initial engagement with the valve than towards end of engagement.

12. The motor of claim 9, wherein the actuator is defined as having a flexible section that extends away from the intermediate section to a tip, the flexible section has a decreasing flexibility traveling from the tip towards the intermediate section such that the flexible section opens the valve more towards end of the engagement with the valve than towards initial engagement.

13. The motor of claim 9, wherein the valve includes a valve stem having a head section and tail section, the tail section forming a fluid seal within an intake chamber preventing compressed fluid from traveling from the intake chamber to the cylinder and the head section positioned in the cylinder such that the actuator engages the head section for a predetermined portion of the power stroke and during such engagement moves the valve stem such that the fluid seal formed by the tail section in the intake chamber is broken to permit compressed air into the cylinder.

14. The motor of claim 9, wherein the intermediate section includes a notch such that the annular groove is opened to a region defined by the cylinder which is below the intermediate section.

15. A piston for use in a motor, wherein the motor includes at least a cylinder for receiving said piston, a crank shaft and a valve for preventing fluid from entering the cylinder, the piston comprising:
a intermediate section that has an annular groove to accommodate a seal that creates and maintains a fluid tight seal against an interior wall defined by the cylinder, said fluid tight seal is maintained during a portion of a power stroke defined by a cyclic motion of the piston in operation, and the intermediate section further includes exhaust vents positioned to temporarily open the fluid tight seal during a portion of an exhaust stroke defined by the cyclic motion of the piston and a portion of the power stroke;
a connecting rod extending in a first direction away from the section to engage said crank shaft; and
an actuator extending in a second direction away from the section and having a flexible section to engage and open said valve for a portion of the power stroke that includes at least said portion of the power stroke when the fluid seal is created and maintained.

16. The piston of claim 15, wherein the actuator is defined as having a rigid portion extending away from the intermediate section to a tip and the flexible section extending away from the tip towards the intermediate section, the flexible section having an increasing flexibility traveling from the tip towards the intermediate section such that the flexible section opens the valve more towards initial engagement with the valve than towards end of engagement.

17. The motor of claim 16, wherein the intermediate section includes a notch such that the annular groove is opened to a region defined by the cylinder which is below the intermediate section.

18. The motor of claim 15, wherein the actuator is defined as having the flexible section that extends away from the intermediate section to a tip, the flexible section has a decreasing flexibility traveling from the tip towards the intermediate section such that the flexible section opens the valve more towards end of the engagement with the valve than towards initial engagement.

19. The motor of claim 18, wherein the intermediate section includes a notch such that the annular groove is opened to a region defined by the cylinder which is below the intermediate section.

20. The motor of claim 15, wherein the valve includes a valve stem having a head section and tail section, the tail section forming a fluid seal within an intake chamber preventing compressed fluid from traveling from the intake chamber to the cylinder and the head section positioned in the cylinder such that the actuator engages the head section for a predetermined portion of the power stroke and during such engagement moves the valve stem such that the fluid seal formed by the tail section in the intake chamber is broken to permit compressed air into the cylinder.

\* \* \* \* \*